US011192449B2

(12) United States Patent
Niikawa et al.

(10) Patent No.: US 11,192,449 B2
(45) Date of Patent: Dec. 7, 2021

(54) DRIVE FORCE TRANSFER DEVICE AND FOUR-WHEEL-DRIVE VEHICLE

(71) Applicant: JTEKT CORPORATION, Osaka (JP)

(72) Inventors: Yoshihiro Niikawa, Kariya (JP); Kenji Korenaga, Anjo (JP)

(73) Assignee: JTEKT CORPORATION, Osaka (JP)

( * ) Notice: Subject to any disclaimer, the term of this patent is extended or adjusted under 35 U.S.C. 154(b) by 186 days.

(21) Appl. No.: 16/774,247

(22) Filed: Jan. 28, 2020

(65) Prior Publication Data

US 2020/0254873 A1    Aug. 13, 2020

(30) Foreign Application Priority Data

Feb. 8, 2019   (JP) .............................. JP2019-021237

(51) Int. Cl.
  *B60K 23/08*   (2006.01)
  *B60K 17/344*  (2006.01)
(52) U.S. Cl.
  CPC ........ *B60K 23/0808* (2013.01); *B60K 17/344* (2013.01); *B60K 2023/0858* (2013.01); *F16D 2500/10431* (2013.01)
(58) Field of Classification Search
  CPC .............. B60K 23/0808; B60K 17/344; B60K 2023/0858; B60K 2023/0833; B60K 23/08; B60K 17/35; B60K 5/04; F16D 2500/10431
  See application file for complete search history.

(56) References Cited

U.S. PATENT DOCUMENTS

| 9,568,050 | B2 * | 2/2017 | Takeuchi | ................ F16D 13/64 |
| 9,931,930 | B2 * | 4/2018 | Ito | ......................... F16D 27/115 |
| 2014/0182995 | A1 * | 7/2014 | Ando | ...................... F16D 69/00 |
| | | | | 192/107 R |

FOREIGN PATENT DOCUMENTS

| JP | 2010-254135 A | 11/2010 |
| JP | 2012-228917 A | 11/2012 |

* cited by examiner

*Primary Examiner* — David J Hlavka
(74) *Attorney, Agent, or Firm* — Oblon, McClelland, Maier & Neustadt, L.L.P.

(57) ABSTRACT

A drive force transfer device is mounted on a four-wheel-drive vehicle having main drive wheels and auxiliary drive wheels. A cam mechanism presses a main clutch in the axial direction. An electromagnetic clutch mechanism actuates the cam mechanism and has an electromagnetic coil and a pilot clutch. When the electromagnetic coil is not energized, the pressing force of the cam mechanism, which is generated because of drag torque of the pilot clutch in the case where a output rotary member rotates faster than a input rotary member, is smaller than that generated because of drag torque of the pilot clutch in the case where the input rotary member rotates faster than the output rotary member.

6 Claims, 6 Drawing Sheets

DRIVE FORCE TRANSFER DEVICE AND FOUR-WHEEL-DRIVE VEHICLE

CROSS-REFERENCE TO RELATED APPLICATION

This application claims priority to Japanese Patent Application No. 2019-021237 filed on Feb. 8, 2019, incorporated herein by reference in its entirety.

BACKGROUND

1. Technical Field

The present disclosure relates to a drive force transfer device mounted on a four-wheel-drive vehicle that has main drive wheels and auxiliary drive wheels to transfer a drive force of a drive source to the auxiliary drive wheels side, and to a four-wheel-drive vehicle.

2. Description of Related Art

In some four-wheel-drive vehicles that have main drive wheels to which a drive force of a drive source such as an engine is transferred at all times and auxiliary drive wheels to which the drive force of the drive source is transferred in accordance with the travel state etc., rotation of a propeller shaft is stopped during travel in a two-wheel-drive state, in which the drive force is transferred to only the main drive wheels, to reduce a power loss due to rotation of the propeller shaft, in order to improve the fuel efficiency performance (see Japanese Unexamined Patent Application Publication No. 2012-228917 (JP 2012-228917 A), for example).

The four-wheel-drive vehicle (stand-by four-wheel-drive vehicle) described in JP 2012-228917 A includes a disconnect mechanism provided on the upstream side (front wheels side) of the propeller shaft in a transfer path for a drive force of an engine that serves as a drive source, and includes an electronic control coupling on the downstream side (rear wheels side) of the propeller shaft in the drive force transfer path. The disconnect mechanism includes a differential-side engagement plate coupled to a differential case of a front differential, a transfer-side engagement plate coupled to a drive gear of a transfer, and a disconnect sleeve that switchably engages and disengages the two plates with and from each other. The electronic control coupling includes a main clutch constituted as a multi-plate friction clutch, a pilot clutch constituted as an electronic multi-plate clutch, an electromagnet, and a cam mechanism. The electronic control coupling is configured such that the pilot clutch is engaged using the magnetic force of the electromagnet and the engagement force of the pilot clutch is converted by the cam mechanism into a pressing force in the axial direction to press the main clutch to engage the main clutch. During travel in the two-wheel-drive state, the propeller shaft is brought into a non-rotating state by blocking torque transfer to the propeller shaft on both the front wheels side and the rear wheels side, by bringing the disconnect mechanism into the disengaged state and bringing the main clutch into the disengaged state with energization of the electromagnet of the electronic control coupling stopped. JP 2012-228917 A indicates that Japanese Unexamined Patent Application Publication No. 2010-254135 (JP 2010-254135 A) should be referred to for a specific configuration of the electronic control coupling.

SUMMARY

In the four-wheel-drive vehicle configured as described above, if drag torque is generated in the pilot clutch during travel in the two-wheel-drive state because of the viscosity of lubricating oil that lubricates the pilot clutch, for example, the cam mechanism may be actuated to press the main clutch. In such a case, the propeller shaft may be rotated with torque, due to rotation of the rear wheels, transferred to the propeller shaft through the electronic control coupling from the downstream side in the drive force transfer path, and the fuel efficiency may not be fully improved.

Thus, the present disclosure provides a drive force transfer device that can reduce a power loss during travel of a four-wheel-drive vehicle in a two-wheel-drive state, and a four-wheel-drive vehicle that includes the drive force transfer device.

A first aspect of the present disclosure provides a drive force transfer device mounted on a four-wheel-drive vehicle that has main drive wheels and auxiliary drive wheels. The drive force transfer device transfers a drive force of a drive source to the auxiliary drive wheels side. The drive force transfer device includes an input rotary member, an output rotary member, a main clutch, a cam mechanism, an electromagnetic clutch mechanism, and a housing. The input rotary member and the output rotary member are configured to rotate coaxially and relative to each other. The main clutch includes a plurality of main clutch plates disposed between the input rotary member and the output rotary member. The cam mechanism is configured to press the main clutch in an axial direction so as to bring the main clutch plates into frictional contact with each other. The cam mechanism has a pilot cam and a main cam. The main cam is configured to press the main clutch using a pressing force generated by relative rotation between the pilot cam and the main cam. The electromagnetic clutch mechanism is configured to actuate the cam mechanism. The electromagnetic clutch mechanism has an electromagnetic coil, a yoke, an armature, and a pilot clutch. The electromagnetic coil is configured to generate a magnetic force when energized. The yoke is configured to hold the electromagnetic coil. The armature is configured to be attracted toward the yoke by the magnetic force. The pilot clutch includes pilot clutch plates disposed between the yoke and the armature. The pilot clutch is interposed between the output rotary member and the pilot cam. The pilot clutch plates are configured such that a frictional sliding portion is lubricated with lubricating oil in the housing. The housing houses the cam mechanism and the electromagnetic clutch mechanism. When the electromagnetic coil is not energized, the pressing force of the cam mechanism which is generated because of drag torque of the pilot clutch in the case where the output rotary member rotates faster than the input rotary member is smaller than the pressing force of the cam mechanism which is generated because of drag torque of the pilot clutch in the case where the input rotary member rotates faster than the output rotary member.

In the drive force transfer device according to the first aspect of the present disclosure, the main cam may be engaged so as to be movable in the axial direction and relatively non-rotatable with respect to the input rotary member.

In the drive force transfer device according to the first aspect of the present disclosure, the housing may be fixed so as to be non-rotatable with respect to a vehicle body. The yoke may be fixed to the housing.

In the drive force transfer device according to the first aspect of the present disclosure, a friction plate may be attached to an end surface of the yoke on the pilot clutch side. A surface of the friction plate on the pilot clutch side may have been subjected to a friction reduction process.

In the drive force transfer device according to the first aspect of the present disclosure, an end surface of the yoke on the pilot clutch side may have been subjected to a friction reduction process.

A second aspect of the present disclosure provides a four-wheel-drive vehicle that has main drive wheels and auxiliary drive wheels, a propeller shaft, a first drive force interruption mechanism, and a second drive force interruption mechanism. The propeller shaft extends in a vehicle front-rear direction and is configured to transfer a drive force of a drive source to the auxiliary drive wheels side. The first drive force interruption mechanism is provided upstream of the propeller shaft in a transfer path for the drive force. The second drive force interruption mechanism is provided downstream of the propeller shaft in the transfer path for the drive force. The second drive force interruption mechanism has an input rotary member and an output rotary member that are rotatable coaxially and relative to each other, a main clutch, a cam mechanism, an electromagnetic clutch mechanism, and a housing. The main clutch includes a plurality of main clutch plates disposed between the input rotary member and the output rotary member. The cam mechanism is configured to press the main clutch in an axial direction to bring the main clutch plates into frictional contact with each other. The cam mechanism has a pilot cam and a main cam. The main cam is configured to press the main clutch using a pressing force generated by relative rotation between the pilot cam and the main cam. The electromagnetic clutch mechanism is configured to actuate the cam mechanism. The electromagnetic clutch mechanism has an electromagnetic coil, a yoke, an armature, and a pilot clutch. The electromagnetic coil is configured to generate a magnetic force when energized. The yoke is configured to hold the electromagnetic coil. The armature is configured to be attracted toward the yoke by the magnetic force. The pilot clutch includes pilot clutch plates disposed between the yoke and the armature. The pilot clutch is interposed between the output rotary member and the pilot cam. The pilot clutch plates are configured such that a frictional sliding portion is lubricated with lubricating oil in the housing. The housing houses the cam mechanism and the electromagnetic clutch mechanism. When the electromagnetic coil is not energized, the pressing force of the cam mechanism which is generated because of drag torque of the pilot clutch in the case where the output rotary member rotates faster than the input rotary member is smaller than the pressing force of the cam mechanism which is generated because of drag torque of the pilot clutch in the case where the input rotary member rotates faster than the output rotary member.

With the present disclosure, it is possible to reduce a power loss during travel of a four-wheel-drive vehicle in a two-wheel-drive state.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiment

An embodiment of the present disclosure will be described with reference to FIGS. 1 to 7B. The embodiment described below is provided as a suitable specific example for carrying out the present disclosure, and includes portions that specifically implement a variety of technical matters that are technically preferable. However, the technical scope of the present disclosure is not limited to such a specific aspect.

Configuration of Four-Wheel-Drive Vehicle

Figure 1:
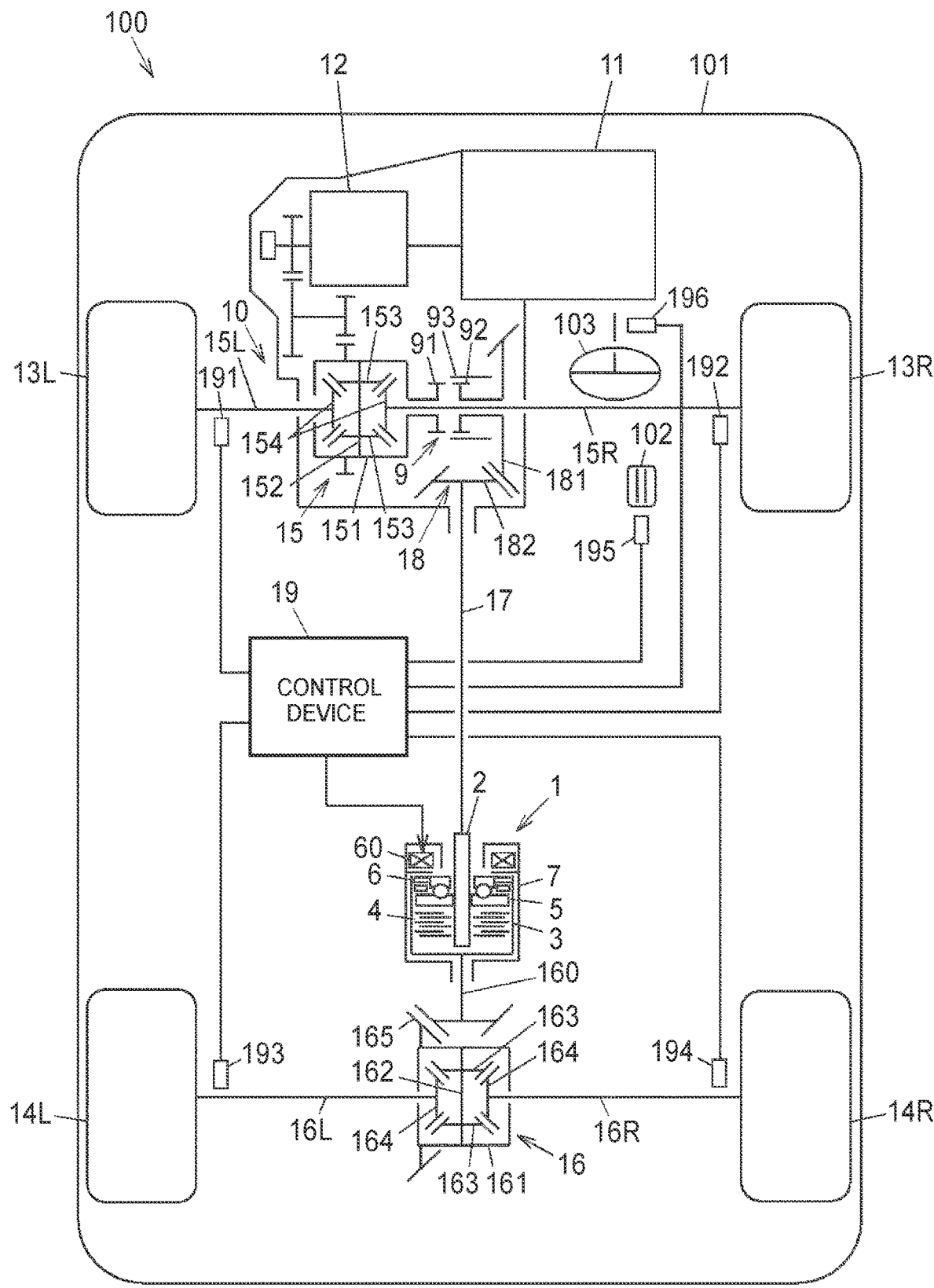
FIG. 1 is a schematic diagram illustrating an example of the configuration of a four-wheel-drive vehicle according to an embodiment of the present disclosure.

FIG. 1 is a schematic diagram illustrating an example of the configuration of a four-wheel-drive vehicle 100 according to an embodiment of the present disclosure. The four-wheel-drive vehicle 100 includes a vehicle body 101, an engine 11 that serves as a drive source that generates a drive force for travel, a transmission 12 that changes the speed of output rotation of the engine 11, front wheels 13R, 13L that serve as a pair of right and left main drive wheels, rear wheels 14R, 14L that serve as a pair of right and left auxiliary drive wheels, a drive force transfer system 10 that can transfer the drive force of the engine 11, the speed of which has been changed by the transmission 12, to the front wheels 13R, 13L and the rear wheels 14R, 14L, and a control device 19. In the present embodiment, the symbols "R" and "L" mean the right side and the left side, respectively, with respect to the direction of forward travel of the vehicle.

The four-wheel-drive vehicle 100 is switchable between a four-wheel-drive state, in which the drive force of the engine 11 is transferred to the front wheels 13R, 13L and the rear wheels 14R, 14L, and a two-wheel-drive state, in which the drive force of the engine 11 is transferred to only the front wheels 13R, 13L. The drive force of the engine 11 is transferred to the front wheels 13R, 13L at all times. The drive force of the engine 11 is transferred to the rear wheels 14R, 14L in accordance with the travel state or a switch operation by a driver.

In the present embodiment, the engine which is an internal combustion engine is applied as the drive source. However, the present disclosure is not limited thereto, and the drive source may be constituted of a combination of an engine and a high-power electric motor such as an interior permanent magnet (IPM) synchronous motor, or may be constituted of only a high-power electric motor.

The drive force transfer system 10 constitutes a drive force transfer path that extends from the transmission 12 to the front wheels 13R, 13L side and the rear wheels 14R, 14L side. The drive force transfer system 10 has: a front differential 15 and a rear differential 16; a propeller shaft 17 that extends in the vehicle front-rear direction to transfer the drive force of the engine 11 to the rear wheels 14R, 14L side; drive shafts 15R, 15L disposed between the front differential 15 and the front wheels 13R, 13L; drive shafts 16R, 16L disposed between the rear differential 16 and the rear wheels 14R, 14L; a meshing clutch mechanism 9 and a transfer gear mechanism 18 disposed between the front differential 15 and the propeller shaft 17; and a drive force transfer device 1 disposed between the propeller shaft 17 and the rear differential 16.

The front differential 15 has: a front differential case 151; a pinion shaft 152 that rotates together with the front differential case 151; a pair of pinion gears 153, 153 supported by the pinion shaft 152; and a pair of side gears 154, 154 meshed with the pair of pinion gears 153, 153 with their gear axes orthogonal to each other. The drive shafts 15R, 15L are coupled to the pair of side gears 154, 154, respectively.

The rear differential 16 has: a rear differential case 161; a pinion shaft 162 that rotates together with the rear differential case 161; a pair of pinion gears 163, 163 supported by the pinion shaft 162; and a pair of side gears 164, 164 meshed with the pair of pinion gears 163, 163 with their gear axes orthogonal to each other. The drive shafts 16R, 16L are coupled to the pair of side gears 164, 164, respectively. A ring gear 165 is fastened to the rear differential case 161 by a bolt, for example. A pinion gear shaft 160 is meshed with the ring gear 165.

The meshing clutch mechanism 9 is an aspect of a first drive force interruption mechanism provided on the upstream side (the front wheels side) of the propeller shaft 17 in the drive force transfer path. The drive force transfer device 1 is an aspect of a second drive force interruption mechanism provided on the downstream side (the rear wheels side) of the propeller shaft 17 in the drive force transfer path. The drive force which is transferred via the meshing clutch mechanism 9 is transferred to the propeller shaft 17 by the transfer gear mechanism 18 which is composed of a ring gear 181 and a pinion gear 182. In the present embodiment, the transfer gear mechanism 18 is constituted of a hypoid gear mechanism, and meshing between the ring gear 181 and the pinion gear 182 is lubricated with lubricating oil.

The control device 19 controls the meshing clutch mechanism 9 and the drive force transfer device 1 so as to switch the meshing clutch mechanism 9 and the drive force transfer device 1 between an actuation state, in which a drive force can be transferred, and a non-actuation state, in which a drive force is not transferred. During travel in the four-wheel-drive state, both the meshing clutch mechanism 9 and the drive force transfer device 1 are brought into the actuation state. When both the meshing clutch mechanism 9 and the drive force transfer device 1 are brought into the non-actuation state during travel in the two-wheel-drive state, rotation of the propeller shaft 17 is stopped. Consequently, a power loss such as the lubricating oil splashing resistance due to rotation of the ring gear 181 and the pinion gear 182 in the transfer gear mechanism 18 is suppressed to improve the fuel efficiency performance.

The control device 19 can acquire detection values from rotational speed sensors 191 to 194 that detect the respective rotational speeds of the front wheels 13L, 13R and the rear wheels 14L, 14R, an accelerator opening sensor 195 that detects the amount of depression of an accelerator pedal 102, and a steering angle sensor 196 that detects the steering angle of a steering wheel 103. The control device 19 switches between the four-wheel-drive state and the two-wheel-drive state based on such detection values, and adjusts the drive force to be transferred to the rear wheels 14R, 14L side through the drive force transfer device 1 in the four-wheel-drive state.

Figure 2A:
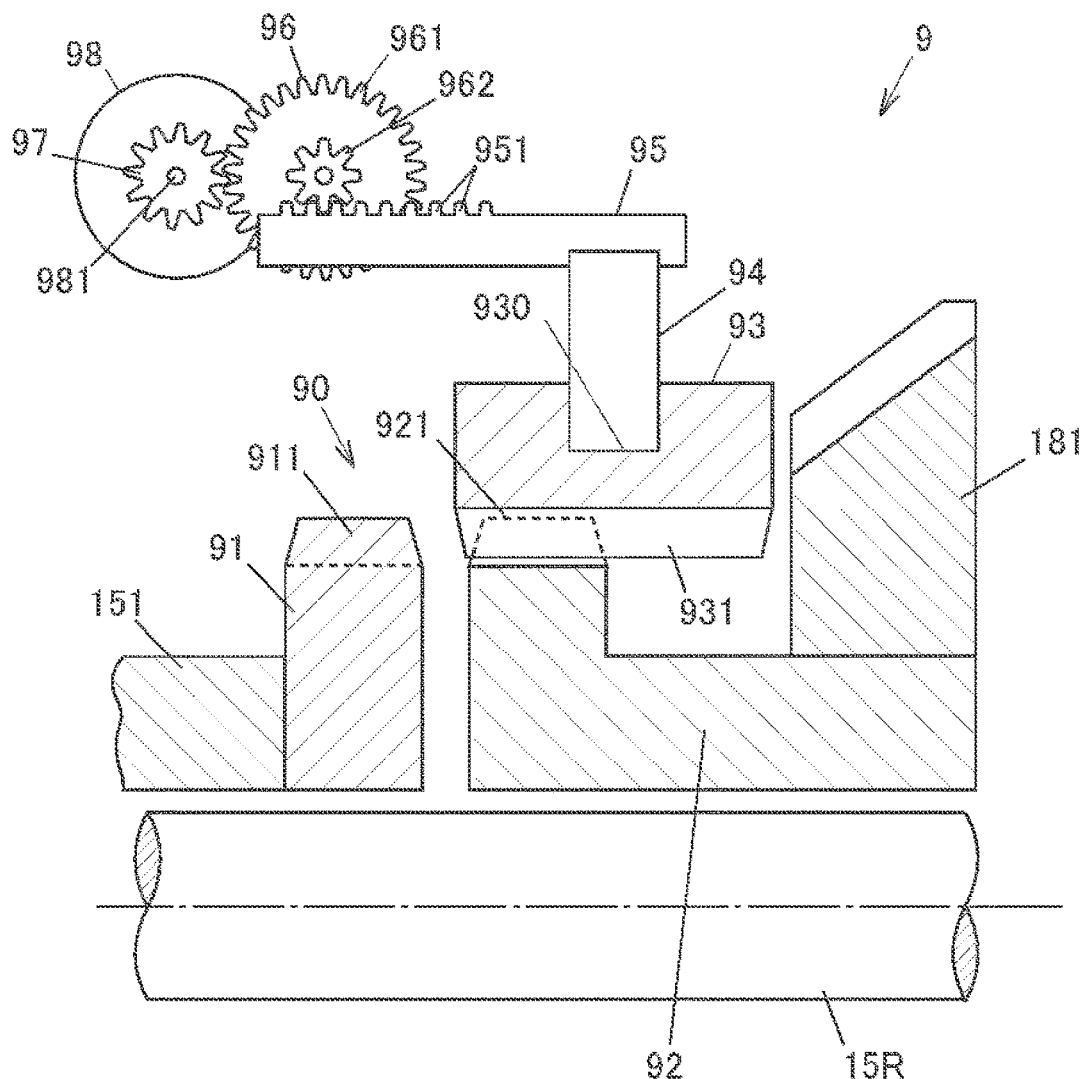
FIG. 2A is a sectional view illustrating an example of the configuration of a meshing clutch mechanism.
Figure 2B:
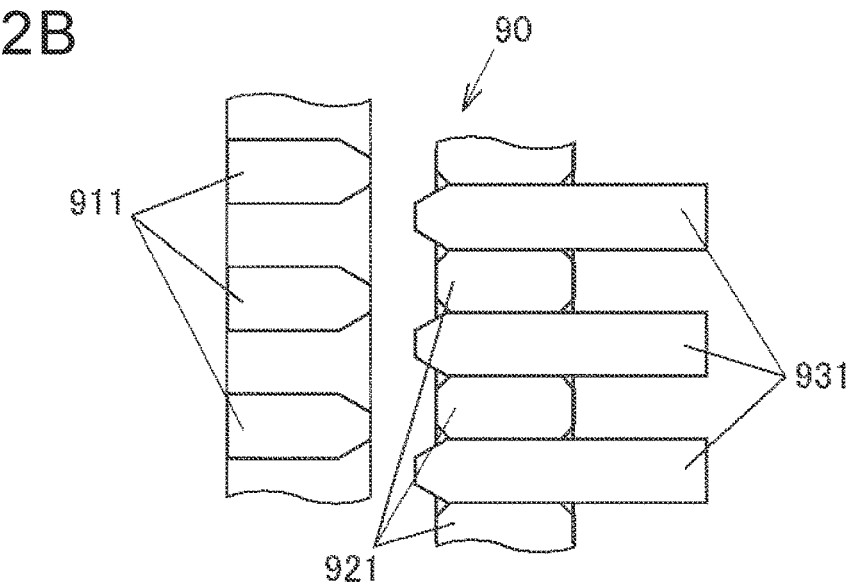
FIG. 2B is an illustration schematically illustrating a meshing portion of the example of the configuration of the meshing clutch mechanism.

FIGS. 2A and 2B illustrate an example of the configuration of the meshing clutch mechanism 9. FIG. 2A is a sectional view. FIG. 2B is an illustration schematically illustrating a meshing portion 90 of the meshing clutch mechanism 9. FIG. 2A illustrates the upper half of the meshing clutch mechanism 9 above the rotational axis of the front differential case 151 which is indicated by the long dashed short dashed line.

The meshing clutch mechanism 9 has a first meshing member 91 fixed to the front differential case 151, a second meshing member 92 fixed to the ring gear 181 of the transfer gear mechanism 18, and a cylindrical sleeve 93 disposed on the outer side of the first meshing member 91 and the second meshing member 92. The first meshing member 91 has a plurality of external teeth 911 on the outer peripheral surface thereof. The second meshing member 92 has a plurality of external teeth 921 on the outer peripheral surface thereof. The sleeve 93 has a plurality of internal teeth 931 that can be meshed with the external teeth 911 and 921 of the first meshing member 91 and the second meshing member 92.

The sleeve 93 is movable back and forth in the axial direction between a non-actuation position, at which the internal teeth 931 are meshed with the external teeth 921 of the second meshing member 92 and not meshed with the external teeth 911 of the first meshing member 91, and an actuation position, at which the internal teeth 931 are meshed with both the external teeth 911 and 921 of the first meshing member 91 and the second meshing member 92. FIGS. 2A and 2B illustrate a state in which the sleeve 93 is located at the non-actuation position.

The meshing clutch mechanism 9 also has a shift fork 94 loosely fitted with an annular groove 930 formed in the outer peripheral surface of the sleeve 93, a rack shaft 95 fastened to the shift fork 94, a speed reduction gear 96 that has a large-diameter tooth portion 961 and a small-diameter tooth portion 962, a pinion gear 97 meshed with the large-diameter tooth portion 961 of the speed reduction gear 96, and an electric motor 98 that rotates the pinion gear 97. The rack shaft 95 has a plurality of rack teeth 951. The rack teeth 951 are meshed with the small-diameter tooth portion 962 of the speed reduction gear 96. The pinion gear 97 is fixed to a motor shaft 981 of the electric motor 98.

A motor current is supplied from the control device 19 to the electric motor 98. When the electric motor 98 is rotated forward, the sleeve 93 is moved from the non-actuation position to the actuation position, and the first meshing member 91 and the second meshing member 92 are coupled via the sleeve 93 so as not to be rotatable relative to each other. When the electric motor 98 is rotated in reverse, meanwhile, the sleeve 93 is moved from the actuation position to the non-actuation position, and the first meshing member 91 and the second meshing member 92 are decoupled from each other. Consequently, transfer of a drive force through the meshing clutch mechanism 9 is blocked.

Configuration of Drive Force Transfer Device

Figure 3A:
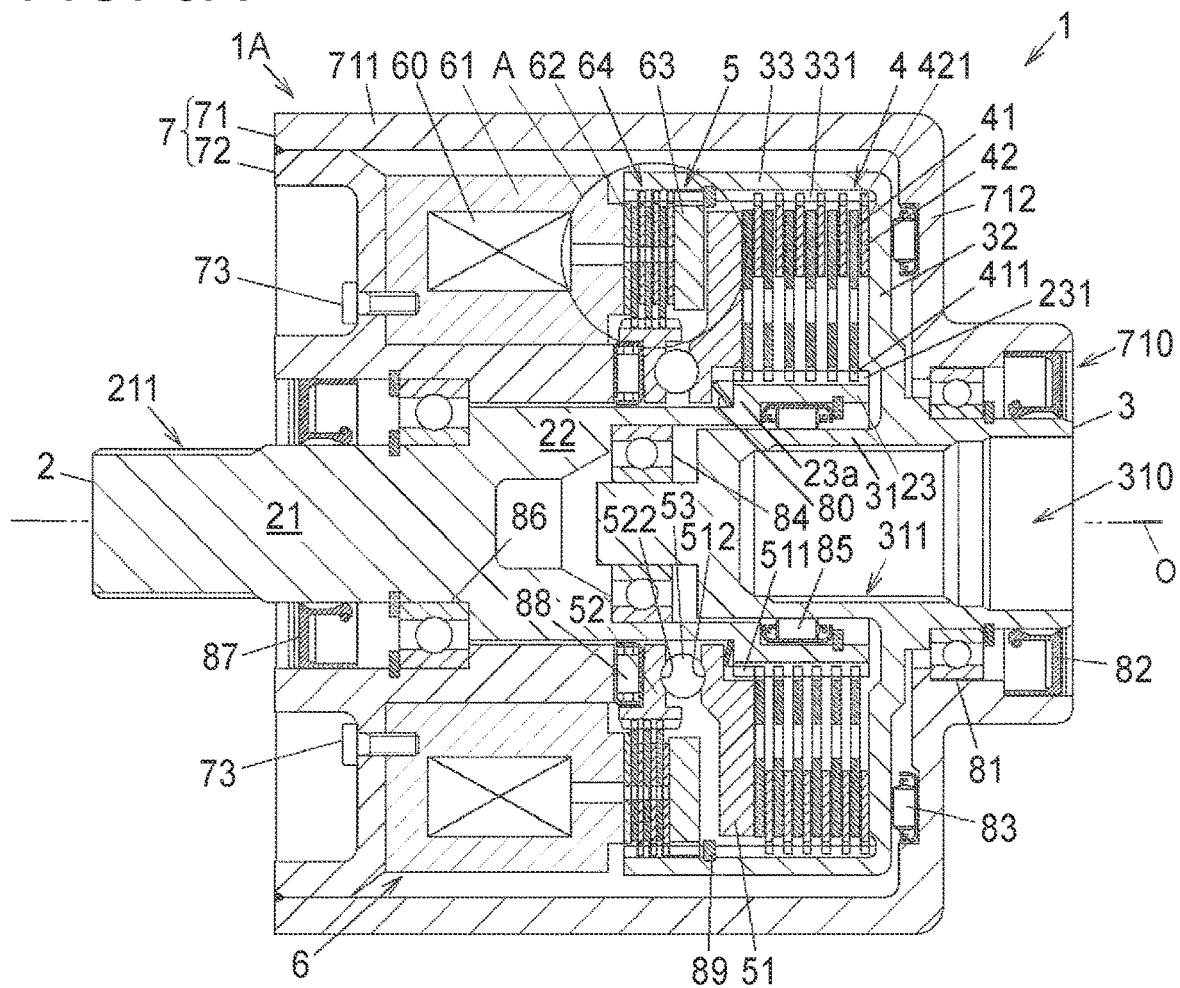
FIG. 3A is a sectional view illustrating an example of the configuration of a drive force transfer device.
Figure 3B:
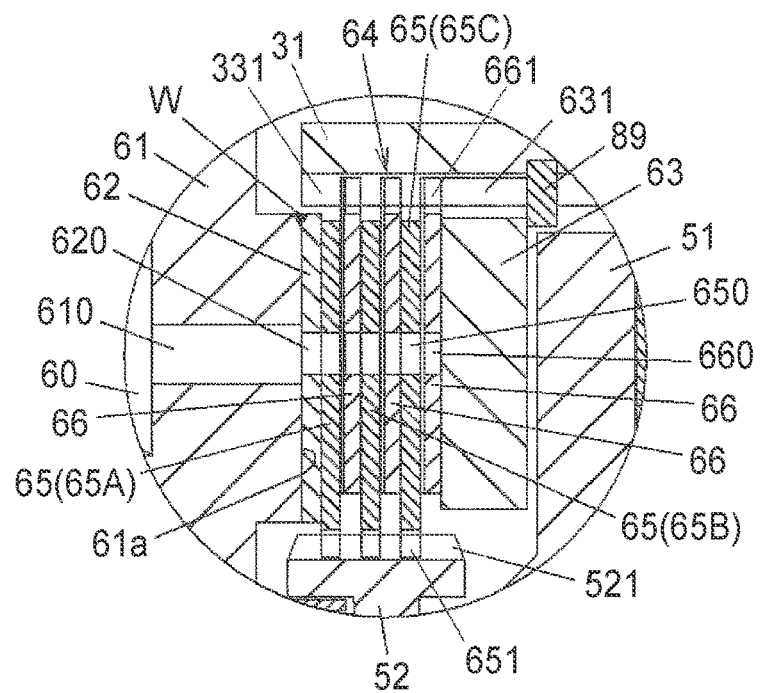
FIG. 3B is an enlarged view of a portion A in FIG. 3A.

FIG. 3A is a sectional view illustrating an example of the configuration of the drive force transfer device 1. FIG. 3B is an enlarged view of a portion A in FIG. 3A. In FIG. 3A, the non-actuation state is illustrated above a rotational axis O, and the actuation state is illustrated below the rotational axis O.

The drive force transfer device 1 has an input shaft 2 that serves as an input rotary member coupled to the propeller shaft 17, a clutch drum 3 that serves as an output rotary member coupled to the pinion gear shaft 160, a main clutch 4 disposed between the input shaft 2 and the clutch drum 3, a cam mechanism 5 that generates a pressing force for pressing the main clutch 4, an electromagnetic clutch mechanism 6 that actuates the cam mechanism 5, and a housing 7 that houses the cam mechanism 5 and the electromagnetic clutch mechanism 6 together with the clutch drum 3.

The housing 7 is attached to a differential carrier that houses the rear differential 16, for example, and non-rotatably fixed to the vehicle body 101. The input shaft 2 and the clutch drum 3 are rotatable relative to each other coaxially about the common rotational axis O. The left side of FIG. 3A corresponds to the front side of the vehicle. The right side of FIG. 3A corresponds to the rear side of the vehicle.

The input shaft 2 has a shaft portion 21, a large-diameter tubular portion 23, and a small-diameter tubular portion 22, which are integral with each other. A spline fitting portion 211 to be coupled to the propeller shaft 17 is provided on the outer peripheral surface of an end portion of the shaft portion 21 on the vehicle front side. The large-diameter tubular portion 23 corresponds to an end portion of the input shaft 2 on the vehicle rear side. The small-diameter tubular portion 22 is located between the shaft portion 21 and the large-diameter tubular portion 23. The large-diameter tubular portion 23 is larger in outside diameter than the small-diameter tubular portion 22. A return spring 80 abuts against a stepped surface 23a between the small-diameter tubular portion 22 and the large-diameter tubular portion 23. The outer peripheral surface of the large-diameter tubular portion 23 is provided with a plurality of spline protrusions 231 that extend in the axial direction which is parallel to the rotational axis O.

The clutch drum 3 has a hollow shaft portion 31, a disk portion 32, and a cylindrical portion 33, which are integral with each other. The hollow shaft portion 31 has a fitting hole 310, on the inner peripheral surface of which a spline fitting portion 311 to be coupled to the pinion gear shaft 160 is formed. The disk portion 32 projects outward from the outer peripheral surface of the hollow shaft portion 31. The cylindrical portion 33 extends from an end of the disk portion 32 on the outer peripheral side toward the vehicle front side. The inner peripheral surface of the cylindrical portion 33 is provided with a plurality of spline protrusions 331 that extend in the axial direction which is parallel to the rotational axis O.

The main clutch 4 is composed of a plurality of main inner clutch plates 41 and a plurality of main outer clutch plates 42. The main inner clutch plates 41 each have a plurality of inner protrusions 411 at an end portion thereof on the inner peripheral side. The inner protrusions 411 are engaged with the spline protrusions 231 of the input shaft 2. The main outer clutch plates 42 each have a plurality of outer protrusions 421 at an end portion thereof on the outer peripheral side. The outer protrusions 421 are engaged with the spline protrusions 331 of the clutch drum 3.

The main inner clutch plates 41 are movable in the axial direction and relatively non-rotatable with respect to the input shaft 2. The main outer clutch plates 42 are movable in the axial direction and relatively non-rotatable with respect to the clutch drum 3. The main inner clutch plates 41 and the main outer clutch plates 42 are disposed alternately in the axial direction. Torque is transferred between the input shaft 2 and the clutch drum 3 by a friction force generated by pressing the main inner clutch plates 41 and the main outer clutch plates 42 in the axial direction.

The cam mechanism 5 has a main cam 51 that faces the main clutch 4, a pilot cam 52 disposed on the vehicle front side of the main cam 51, and a plurality of cam balls 53 disposed between the main cam 51 and the pilot cam 52. The main cam 51 has spline protrusions 511 to be engaged with the spline protrusions 231 of the input shaft 2, and is movable in the axial direction and relatively non-rotatable with respect to the input shaft 2. The outer peripheral surface of the pilot cam 52 is provided with a plurality of spline protrusions 521 that extend in the axial direction which is parallel to the rotational axis O. The main cam 51 is biased toward the pilot cam 52 by the return spring 80.

The plurality of cam balls 53 roll in a plurality of cam grooves 512 formed in a surface of the main cam 51 that faces the pilot cam 52 and a plurality of cam grooves 522 formed in a surface of the pilot cam 52 that faces the main cam 51. The cam grooves 512 and 522 extend in the circumferential direction. The depth of the cam grooves 512 and 522 in the axial direction is largest at the middle portion in the circumferential direction, and becomes gradually smaller away from the middle portion. The clearance between the main cam 51 and the pilot cam 52 is smallest when the cam balls 53 are positioned at the middle portion of the cam grooves 512 and 522, and becomes gradually larger as the cam balls 53 roll away from the middle portion.

The cam mechanism 5 generates a pressing force for pressing the main clutch 4 in the axial direction through relative rotation between the main cam 51 and the pilot cam 52. The main cam 51 and the pilot cam 52 are rotatable relative to each other in the range in which the cam balls 53 roll in the cam grooves 512 and 522. In the main clutch 4, the main inner clutch plates 41 and the main outer clutch plates 42 are pressed by the main cam 51 to make frictional contact with each other.

The electromagnetic clutch mechanism 6 has an electromagnetic coil 60 that generates a magnetic force when energized, a yoke 61 that holds the electromagnetic coil 60, an all-differential washer 62 that serves as a friction plate attached to an end surface 61a of the yoke 61 on the vehicle rear side, an armature 63 to be attracted toward the yoke 61 by the magnetic force of the electromagnetic coil 60, and a pilot clutch 64 disposed between the all-differential washer 62 and the armature 63.

The armature 63 is made of soft magnetic metal such as iron, and has spline protrusions 631 on the outer peripheral end portion thereof to be engaged with the spline protrusions 331 of the clutch drum 3. The armature 63 is non-rotatable relative to the clutch drum 3 with the spline protrusions 631 engaged with the spline protrusions 331 of the clutch drum 3, and movable in the axial direction over a predetermined range with respect to the clutch drum 3. In the present embodiment, movement of the armature 63 in the axial direction away from the yoke 61 is restricted by a stopper ring 89 attached to the cylindrical portion 33 of the clutch drum 3.

The pilot clutch 64 is disposed as interposed between the clutch drum 3 and the pilot cam 52. The pilot clutch 64 is made of a plurality of pilot inner clutch plates 65 that are movable in the axial direction and relatively non-rotatable with respect to the pilot cam 52, and a plurality of pilot outer clutch plates 66 that are movable in the axial direction and relatively non-rotatable with respect to the clutch drum 3. The pilot inner clutch plates 65 and the pilot outer clutch plates 66 are made of soft magnetic metal such as iron, and shaped by pressing, for example. In the present embodiment, the pilot clutch 64 has three pilot inner clutch plates 65 and three pilot outer clutch plates 66, and the pilot inner clutch plates 65 and the pilot outer clutch plates 66 are disposed alternately in the axial direction.

The pilot inner clutch plate 65 on the vehicle foremost side, among the three pilot inner clutch plates 65, faces the all-differential washer 62. In the case where it is necessary to specify each of the three pilot inner clutch plates 65 in the following description, the pilot inner clutch plate 65 which faces the all-differential washer 62 is referred to as a first pilot inner clutch plate 65A, the pilot inner clutch plate 65 which is positioned on the vehicle rearmost side is referred to as a third pilot inner clutch plate 65C, and the pilot inner clutch plate 65 between the first pilot inner clutch plate 65A and the third pilot inner clutch plate 65C is referred to as a second pilot inner clutch plate 65B.

The pilot outer clutch plate 66 on the vehicle rearmost side, among the three pilot outer clutch plates 66, faces the armature 63. The two other pilot outer clutch plates 66 are disposed between the first pilot inner clutch plate 65A and the second pilot inner clutch plate 65B and between the second pilot inner clutch plate 65B and the third pilot inner clutch plate 65C.

An excitation current is supplied from the control device 19 to the electromagnetic coil 60. When the electromagnetic coil 60 is energized, the pilot clutch 64 is pressed in the axial direction by the armature 63, and the pilot inner clutch plates 65 and the pilot outer clutch plates 66 make frictional contact with each other. The pilot cam 52 is relatively rotated with respect to the main cam 51 by a friction force generated between the pilot inner clutch plates 65 and the pilot outer clutch plates 66.

The housing 7 has a housing main body 71 in a bottomed cylindrical shape that opens toward the vehicle front side, and a housing lid body 72 that blocks an end portion of the housing main body 71 on the opening side thereof. The housing lid body 72 is fixed to the housing main body 71 by welding. The yoke 61 is fixed to the housing lid body 72 by a plurality of bolts 73. An annular slit 610 is formed at an end portion of the yoke 61 on the vehicle rear side. The slit 610 communicates between a space that houses the electromagnetic coil 60 and the outside, and opens in the end surface 61a on the pilot clutch 64 side.

The housing main body 71 has a cylindrical portion 711 and a bottom portion 712, which are integral with each other. The bottom portion 712 is provided on the vehicle rear side of the cylindrical portion 711. A through hole 710 is provided at the center portion of the bottom portion 712. An end portion of the hollow shaft portion 31 of the clutch drum 3 on the vehicle rear side is inserted through the through hole 710.

A ball bearing 81 and a seal member 82 are disposed between the housing main body 71 and the hollow shaft portion 31. A thrust roller bearing 83 is disposed between the disk portion 32 of the clutch drum 3 and the bottom portion 712 of the housing main body 71. A ball bearing 84 and a radial roller bearing 85 are disposed between the large-diameter tubular portion 23 of the input shaft 2 and the hollow shaft portion 31 of the clutch drum 3. A ball bearing 86 and a seal member 87 are disposed between the shaft portion 21 of the input shaft 2 and the housing lid body 72. A thrust roller bearing 88 is disposed between the pilot cam 52 and the housing lid body 72. Movement of the pilot cam 52 in the axial direction toward the vehicle front side is regulated by the thrust roller bearing 88.

Lubricating oil (not illustrated) is sealed in the housing 7. Frictional sliding between the main inner clutch plates 41 and the main outer clutch plates 42 and frictional sliding between the pilot inner clutch plates 65 and the pilot outer clutch plates 66 is lubricated with the lubricating oil in the housing 7 to suppress wear and overheating of such clutch plates.

Figure 4A:
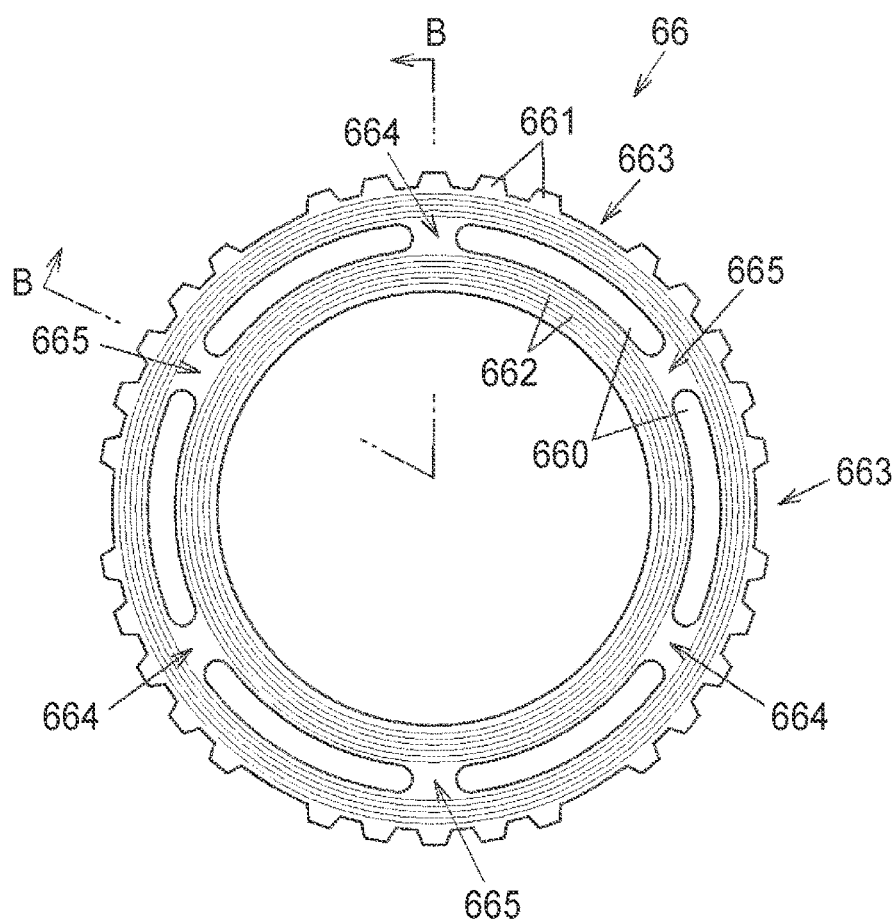
FIG. 4A is a plan view of a pilot outer clutch plate.
Figure 4B:
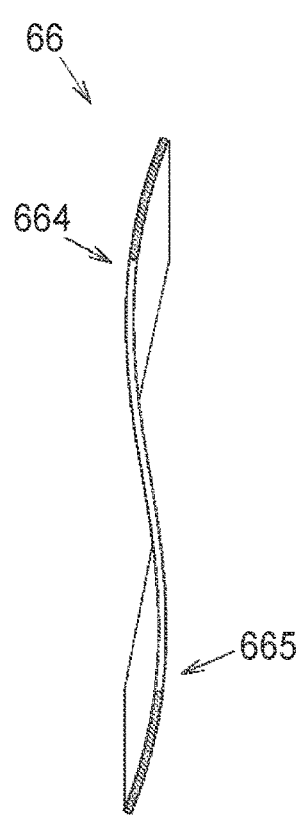
FIG. 4B is a sectional view taken along the line B-B in FIG. 4A.
Figure 5:
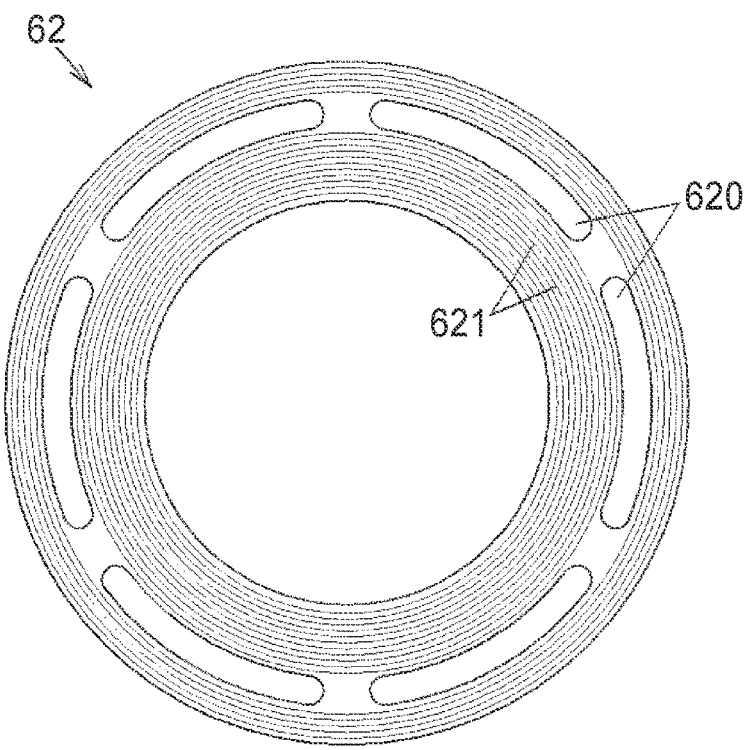
FIG. 5 is a plan view illustrating an all-differential washer.
Figure 6:
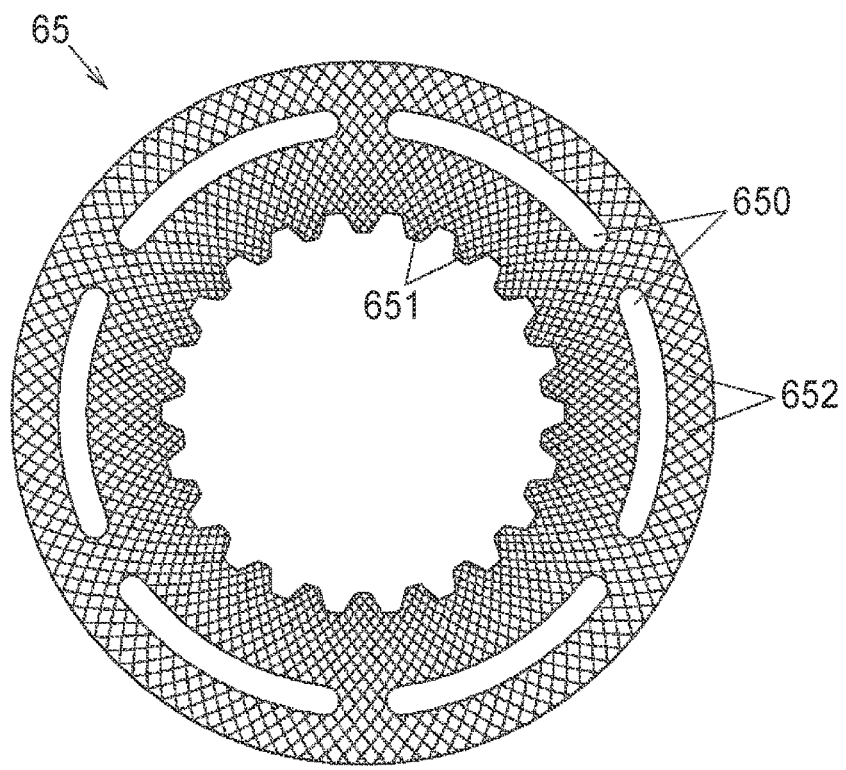
FIG. 6 is a plan view illustrating a pilot inner clutch plate.

FIGS. 4A and 4B illustrate the pilot outer clutch plate 66. FIG. 4A is a plan view. FIG. 4B is a sectional view taken along the line B-B in FIG. 4A. FIG. 5 is a plan view illustrating the all-differential washer 62. FIG. 6 is a plan view illustrating the pilot inner clutch plate 65.

As illustrated in FIGS. 3B, 4A and 4B, the pilot outer clutch plate 66 has a plurality of outer protrusions 661 to be engaged with the spline protrusions 331 of the clutch drum 3. The pilot outer clutch plate 66 is movable in the axial direction and relatively non-rotatable with respect to the clutch drum 3 with the outer protrusion 661 engaged with the spline protrusions 331. The pilot outer clutch plate 66 is formed with a plurality of concentric minute grooves 662 in both surfaces thereof, and has been subjected to a diamond like carbon (DLC) coating process.

The pilot outer clutch plate 66 is also formed with a plurality of arcuate slits 660 that penetrate the pilot outer clutch plate 66 in the thickness direction at positions side by side with the slit 610 of the yoke 61 in the axial direction. In the present embodiment, six slits 660 are formed at equal intervals in the circumferential direction. Furthermore, toothless portions 663 at which no outer protrusions 661 are provided are formed at the outer peripheral portion of the pilot outer clutch plate 66. In the present embodiment, six toothless portions 663 are formed at positions on the outer peripheral side of the slits 610. The toothless portions 663 facilitate a flow of lubricating oil.

As illustrated in FIG. 4B, the pilot outer clutch plate 66 is curved in a wavy shape along the circumferential direction, and formed with a plurality of first crest portions 664 that project toward one side (vehicle front side) in the axial direction and a plurality of second crest portions 665 that project toward the other side (vehicle rear side) in the axial direction. In the present embodiment, three first crest portions 664 and three second crest portions 665 are formed.

The plurality of first crest portions 664 of the pilot outer clutch plate 66 which is positioned most on the vehicle front side (the yoke 61 side), of the three pilot outer clutch plates 66, elastically contact the all-differential washer 62, and the second crest portions 665 of the pilot outer clutch plate 66 which is positioned most on the vehicle rear side (the armature 63 side) elastically contact the armature 63. Meanwhile, the first crest portions 664 and second crest portions 665 of the middle pilot outer clutch plate 66, of the three pilot outer clutch plates 66, elastically contact the second pilot inner clutch plate 65B and the third pilot inner clutch plate 65C, respectively.

FIG. 5 is a plan view illustrating a surface of the all-differential washer 62 on the pilot clutch 64 side. The all-differential washer 62 is made of soft magnetic metal such as iron, and formed with a plurality of arcuate slits 620 that penetrate the all-differential washer 62 in the thickness direction at positions side by side with the slit 610 of the yoke 61 in the axial direction. In the present embodiment, six slits 620 are formed at equal intervals in the circumferential direction. The all-differential washer 62 is also formed with a plurality of concentric minute grooves 621 in a surface thereof on the pilot clutch 64 side. A surface of the all-differential washer 62 that faces the end surface 61a of the yoke 61 may also be formed with similar minute grooves 621.

At least a surface of the all-differential washer 62 on the pilot clutch 64 side has been subjected to a friction reduction process. In the present embodiment, both surfaces of the all-differential washer 62 have been subjected to a DLC coating process that is similar to that for the pilot outer clutch plates 66. The friction reduction process is not limited to the DLC coating process, and may be a variety of processes that can reduce a friction coefficient or wear. For example, the all-differential washer 62 may be subjected to a heat treatment such as Nitrotec (registered trademark) and a plating process.

The all-differential washer 62 is non-rotatably fixed to the yoke 61. In the present embodiment, an end portion of the all-differential washer 62 on the outer peripheral side is welded to the yoke 61 at a plurality of locations. In FIG. 3B, one of such welded portions W is illustrated. The unit which fixes the all-differential washer 62 to the yoke 61 is not limited to welding, and the all-differential washer 62 may be fixed by bolting or clinching, for example. The housing 7, the yoke 61, and the all-differential washer 62 constitute a fixed system 1A which does not rotate with respect to the vehicle body 101.

FIG. 6 is a plan view illustrating the pilot inner clutch plate 65. The pilot inner clutch plate 65 has a plurality of inner protrusions 651 to be engaged with the spline protrusions 521 of the pilot cam 52, and a plurality of arcuate slits 650 formed at equal intervals in the circumferential direction to penetrate the pilot inner clutch plate 65 in the thickness direction at positions side by side in the axial direction with the slits 610 of the yoke 61. Grid-like oil grooves 652 are formed in both surfaces of the pilot inner clutch plate 65.

Operation of Drive Force Transfer Device

In the drive force transfer device 1 configured as described above, when an excitation current is supplied from the control device 19 to the electromagnetic coil 60 of the electromagnetic clutch mechanism 6, magnetic flux is generated in the yoke 61, the all-differential washer 62, the pilot inner clutch plates 65, the pilot outer clutch plates 66, and the armature 63, and the armature 63 is attracted toward the yoke 61. The slits 610, 620, 650, and 660 of the various parts suppress short-circuiting of magnetic flux.

When the armature 63 is attracted toward the yoke 61, the pilot inner clutch plates 65 and the pilot outer clutch plates 66 are pressed against each other, which generates a friction force that regulates relative rotation between the clutch drum 3 and the pilot cam 52 and generates a friction force between the first pilot inner clutch plate 65A and the all-differential washer 62. The friction force which is generated between the first pilot inner clutch plate 65A and the all-differential washer 62 serves as a braking force that brakes rotation of the pilot cam 52 with respect to the fixed system 1A including the all-differential washer 62.

In this manner, when the input shaft 2 is rotated with the pilot cam 52 braked, the main cam 51 and the pilot cam 52 which rotate together with the input shaft 2 rotate relative to each other to cause the cam balls 53 to roll in the cam grooves 512 and 522, and the main cam 51 is moved away from the pilot cam 52 to press the main clutch 4. Consequently, the main inner clutch plates 41 and the main outer clutch plates 42 make frictional contact with each other to generate a friction force, and a drive force is transferred from the input shaft 2 to the clutch drum 3 by the friction force.

When supply of the excitation current from the control device 19 to the electromagnetic coil 60 is stopped, on the other hand, the main cam 51 is moved toward the pilot cam 52 by the biasing force of the return spring 80, and the armature 63 is moved in the direction away from the yoke 61 by the restoring force of the pilot outer clutch plates 66, which have been curved, to abut against the stopper ring 89. Consequently, rotational torque of the input shaft 2 is not easily transmitted to the clutch drum 3 even if the input shaft 2 is rotated.

A frictional sliding portion between the pilot inner clutch plates 65 and the pilot outer clutch plates 66 is lubricated with lubricating oil in the housing 7. Thus, non-negligible drag torque is generated between the pilot inner clutch plates 65 and the pilot outer clutch plates 66 and between the all-differential washer 62 and the first pilot inner clutch plate 65A in the pilot clutch 64, in particular at low temperatures at which the viscosity of the lubricating oil is high.

In the drive force transfer device 1 according to the present embodiment, when the electromagnetic coil 60 is not energized, the pressing force of the cam mechanism 5, which is generated because of drag torque of the pilot clutch 64 in the case where the clutch drum 3 rotates faster than the input shaft 2, is smaller than the pressing force of the cam mechanism 5, which is generated because of drag torque of the pilot clutch 64 in the case where the input shaft 2 rotates faster than the clutch drum 3. This will be described specifically with reference to FIGS. 7A and 7B. In the following description, drag torque generated between the pilot inner clutch plates 65 and the pilot outer clutch plates 66 is defined as T1, and drag torque generated between the all-differential washer 62 and the first pilot inner clutch plate 65A is defined as T2.

Figure 7A:
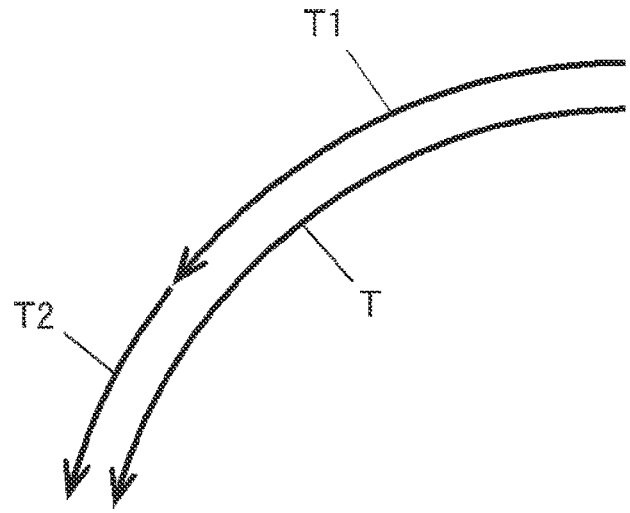
FIG. 7A is an illustration schematically illustrating the relationship among drag torque for a pilot clutch, drag torque generated between an all-differential washer and a first pilot inner clutch plate, and relative rotation torque between a main cam and a pilot cam in a case where an input shaft rotates faster than a clutch drum because of torque input to the input shaft.
Figure 7B:
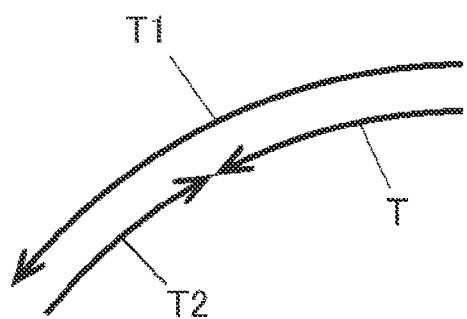
FIG. 7B is an illustration schematically illustrating the relationship among the drag torque for the pilot clutch, the drag torque generated between the all-differential washer and the first pilot inner clutch plate, and the relative rotation torque between the main cam and the pilot cam in a case where the clutch drum rotates faster than the input shaft because of torque conversely input to the clutch drum.

FIG. 7A is an illustration schematically illustrating the relationship among the drag torque T1, the drag torque T2, and relative rotation torque T between the main cam 51 and the pilot cam 52, which are generated in the case where the input shaft 2 and the clutch drum 3 rotate in the same direction, and the input shaft 2 rotates faster than the clutch drum 3. FIG. 7B is an illustration schematically illustrating the relationship among the drag torque T1, the drag torque T2, and the relative rotation torque T between the main cam 51 and the pilot cam 52, which are generated in the case where the input shaft 2 and the clutch drum 3 rotate in the same direction, and the clutch drum 3 rotates faster than the input shaft 2.

In the case where the input shaft 2 rotates faster than the clutch drum 3, the main cam 51 rotates together with the input shaft 2, and thus a force that suppresses rotation of the pilot cam 52 serves as the relative rotation torque T which rotates the main cam 51 and the pilot cam 52 relative to each other. In this case, the drag torque T1 and the drag torque T2 serve as a force that suppresses rotation of the pilot cam 52.

Thus, the resultant force of the drag torque T1 and the drag torque T2 serves as the relative rotation torque T as illustrated in FIG. 7A.

In the case where the clutch drum 3 rotates faster than the input shaft 2, on the other hand, the pilot cam 52 rotates in the same direction as the clutch drum 3 because of the drag torque T1, while the drag torque T2 serves as a braking force that brakes rotation of the pilot cam 52 with respect to the fixed system 1A. In this case, as illustrated in FIG. 7B, the difference between the drag torque T1 and the drag torque T2 serves as the relative rotation torque T which rotates the main cam 51 and the pilot cam 52 relative to each other.

In this manner, the relative rotation torque T is smaller in the case where the clutch drum 3 rotates faster than the input shaft 2 than in the case where the input shaft 2 rotates faster than the clutch drum 3. Cam thrust (pressing force for the main clutch 4) generated by the cam mechanism 5 is proportional to the relative rotation torque T. Thus, torque transferred between the input shaft 2 and the clutch drum 3 when the electromagnetic coil 60 is not energized is smaller in the case where the clutch drum 3 rotates faster than the input shaft 2 than in the case where the input shaft 2 rotates faster than the clutch drum 3.

Operation of Four-Wheel-Drive Vehicle

When the four-wheel-drive vehicle 100 is caused to travel in the four-wheel-drive state, the control device 19 brings the meshing clutch mechanism 9 into the actuation state by meshing the sleeve 93 with the first meshing member 91 and the second meshing member 92 by rotating the electric motor 98 of the meshing clutch mechanism 9 forward, and brings the drive force transfer device 1 into the actuation state by outputting an excitation current to the electromagnetic coil 60 of the electromagnetic clutch mechanism 6. Consequently, the drive force of the engine 11, the speed of which has been changed by the transmission 12, is distributed to the right and left front wheels 13R, 13L by the front differential 15, and distributed to the rear wheels 14R, 14L by the rear differential 16. The drive force which is transferred from the propeller shaft 17 to the rear differential 16 is adjustable in accordance with the magnitude of the excitation current, and the drive force distribution ratio between the front and rear wheels can be varied by increasing and decreasing the excitation current.

When the four-wheel-drive vehicle 100 is caused to travel in the two-wheel-drive state, meanwhile, the control device 19 brings the meshing clutch mechanism 9 into the non-actuation state by moving the sleeve 93 to decouple the first meshing member 91 and the second meshing member 92 by rotating the electric motor 98 of the meshing clutch mechanism 9 in reverse, and brings the drive force transfer device 1 into the non-actuation state by stopping the output of the excitation current to the electromagnetic coil 60. At this time, the pinion gear shaft 160 and the clutch drum 3 rotate along with rotation of the rear wheels 14R, 14L. Therefore, if large torque is transferred from the clutch drum 3 to the input shaft 2 because of drag torque, the propeller shaft 17 may be rotated to cause a power loss such as the resistance against splash of lubricating oil due to rotation of the ring gear 181 and the pinion gear 182 in the transfer gear mechanism 18.

In the present embodiment, however, torque transferred between the input shaft 2 and the clutch drum 3 is suppressed with the configuration described above in the case where the clutch drum 3 rotates faster than the input shaft 2, which suppresses a power loss generated by rotation of the propeller shaft 17.

Effect of Embodiment

With the drive force transfer device 1 according to the present embodiment described above and the four-wheel-drive vehicle 100 which includes the drive force transfer device 1, torque transferred from the clutch drum 3 to the input shaft 2 can be suppressed during travel in the two-wheel-drive state in which both the meshing clutch mechanism 9 and the drive force transfer device 1 are brought into the non-actuation state. Thus, rotation of the propeller shaft 17 is suppressed, and a power loss can be reduced. Since the all-differential washer 62 has been subjected to a friction reduction process, wear due to frictional sliding between the all-differential washer 62 and the first pilot inner clutch plate 65A can be suppressed.

Modification of Embodiment

Figure 8:
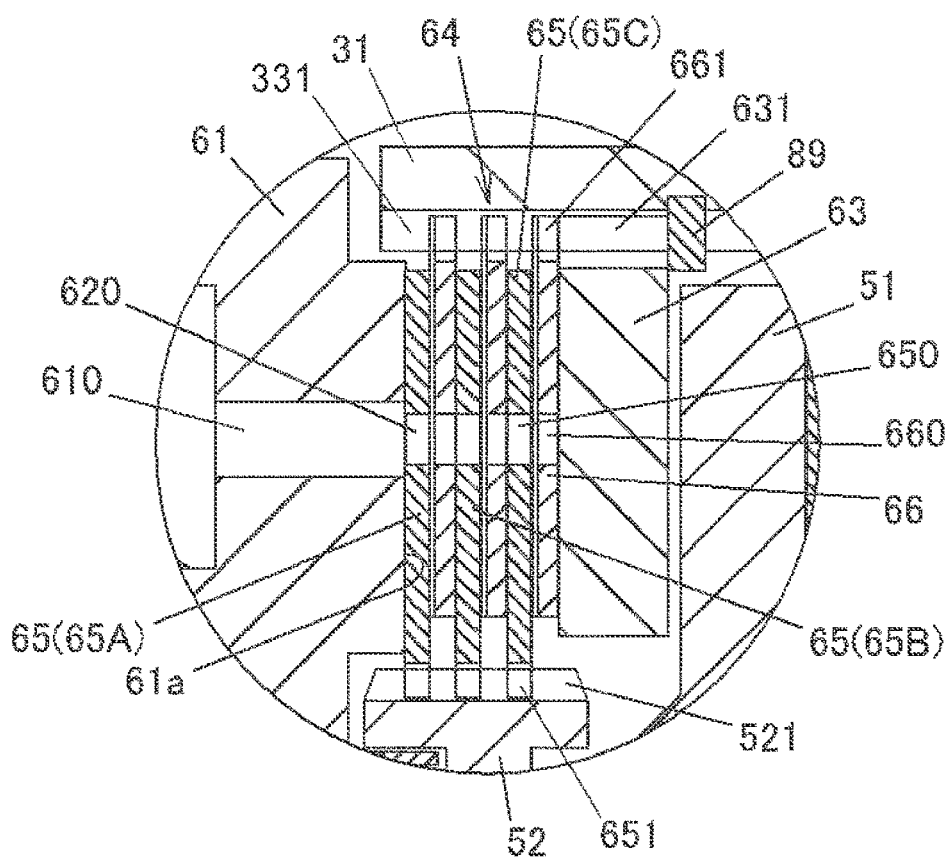
FIG. 8 is a sectional view illustrating a part of a drive force transfer device according to a modification.

FIG. 8 is a sectional view illustrating a part of a drive force transfer device according to a modification. In the embodiment described above with reference to FIG. 3A etc., the all-differential washer 62 is attached to the end surface 61a of the yoke 61. In a modification illustrated in FIG. 8, however, the all-differential washer 62 is omitted, and the end surface 61a of the yoke 61 on the vehicle rear side (the pilot clutch 64 side) faces the first pilot inner clutch plate 65A. When the electromagnetic coil 60 is energized, the first pilot inner clutch plate 65A is pressed against the end surface 61a of the yoke 61. In this modification, the end surface 61a of the yoke 61 has been subjected to a friction reduction process. Specific examples of the friction reduction process include a DLC coating process. Also with such a modification, the same function and effect as those described above can be obtained.

Additional Remarks

While the present disclosure has been described above based on the embodiment, such an embodiment does not limit applicable embodiments according to the claims. It should be noted that all combinations of the characteristics described in relation to the embodiment are not necessarily essential to address the issue of the present disclosure.

The present disclosure can be modified, as appropriate, without departing from the scope and spirit thereof. For example, in the embodiment described above, the number of the pilot inner clutch plates 65 and the pilot outer clutch plates 66 of the pilot clutch 64 is three each. However, the number of such clutch plates is changeable as appropriate. The pilot inner clutch plates 65 may be omitted, and a single pilot outer clutch plate 66 may be interposed between the armature 63 and the all-differential washer 62 or the end surface 61a of the yoke 61.

In the embodiment described above, the pilot outer clutch plates 66 are curved. However, the present disclosure is not limited thereto, and the pilot outer clutch plates 66 may be flat. Furthermore, the friction reduction process for the all-differential washer 62 and the end surface 61a of the yoke 61 may be performed as necessary, and the friction reduction process may not be performed if there is no problem in terms of durability etc.

What is claimed is:

1. A drive force transfer device mounted on a four-wheel-drive vehicle that has main drive wheels and auxiliary drive wheels, the drive force transfer device configured to transfer a drive force of a drive source to the auxiliary drive wheels side, the drive force transfer device comprising:
an input rotary member and an output rotary member configured to rotate coaxially and relative to each other;

a main clutch that includes a plurality of main clutch plates disposed between the input rotary member and the output rotary member;

a cam mechanism configured to press the main clutch in an axial direction so as to bring the main clutch plates into frictional contact with each other, the cam mechanism having a pilot cam and a main cam, and the main cam being configured to press the main clutch using a pressing force generated by relative rotation between the pilot cam and the main cam;

an electromagnetic clutch mechanism configured to actuate the cam mechanism, the electromagnetic clutch mechanism having an electromagnetic coil, a yoke, an armature, and a pilot clutch, the electromagnetic coil being configured to generate a magnetic force when energized, the yoke being configured to hold the electromagnetic coil, the armature being configured to be attracted toward the yoke by the magnetic force, the pilot clutch including pilot clutch plates disposed between the yoke and the armature, the pilot clutch being interposed between the output rotary member and the pilot cam, and the pilot clutch plates being configured such that a frictional sliding portion is lubricated with lubricating oil in a housing; and the housing which houses the cam mechanism and the electromagnetic clutch mechanism, wherein when the electromagnetic coil is not energized, the pressing force of the cam mechanism, which is generated because of drag torque of the pilot clutch in the case where the output rotary member rotates faster than the input rotary member, is smaller than the pressing force of the cam mechanism, which is generated because of drag torque of the pilot clutch in the case where the input rotary member rotates faster than the output rotary member.

2. The drive force transfer device according to claim 1, wherein the main cam is engaged so as to be movable in the axial direction and relatively non-rotatable, with respect to the input rotary member.

3. The drive force transfer device according to claim 1, wherein:

the housing is fixed so as to be non-rotatable with respect to a vehicle body; and the yoke is fixed to the housing.

4. The drive force transfer device according to claim 3, further comprising:

a friction plate attached to an end surface of the yoke on the pilot clutch side, wherein a surface of the friction plate on the pilot clutch side having been subjected to a friction reduction process.

5. The drive force transfer device according to claim 3, wherein an end surface of the yoke on the pilot clutch side has been subjected to a friction reduction process.

6. A four-wheel-drive vehicle comprising:

main drive wheels and auxiliary drive wheels;

a propeller shaft extending in a vehicle front-rear direction and configured to transfer a drive force of a drive source to the auxiliary drive wheels side;

a first drive force interruption mechanism provided upstream of the propeller shaft in a transfer path for the drive force; and a second drive force interruption mechanism provided downstream of the propeller shaft in the transfer path for the drive force, the second drive force interruption mechanism having an input rotary member and an output rotary member that are rotatable coaxially and relative to each other, a main clutch, a cam mechanism, an electromagnetic clutch mechanism, and a housing, the main clutch including a plurality of main clutch plates disposed between the input rotary member and the output rotary member, the cam mechanism being configured to press the main clutch in an axial direction to bring the main clutch plates into frictional contact with each other, the cam mechanism having a pilot cam and a main cam, the main cam being configured to press the main clutch using a pressing force generated by relative rotation between the pilot cam and the main cam, the electromagnetic clutch mechanism being configured to actuate the cam mechanism, the electromagnetic clutch mechanism having an electromagnetic coil, a yoke, an armature, and a pilot clutch, the electromagnetic coil being configured to generate a magnetic force when energized, the yoke being configured to hold the electromagnetic coil, the armature being configured to be attracted toward the yoke by the magnetic force, the pilot clutch including pilot clutch plates disposed between the yoke and the armature, the pilot clutch being interposed between the output rotary member and the pilot cam, the pilot clutch plates being configured such that a frictional sliding portion is lubricated with lubricating oil in the housing, and the housing that houses the cam mechanism and the electromagnetic clutch mechanism, wherein when the electromagnetic coil is not energized, the pressing force of the cam mechanism, which is generated because of drag torque of the pilot clutch in the case where the output rotary member rotates faster than the input rotary member, is smaller than the pressing force of the cam mechanism, which is generated because of drag torque of the pilot clutch in the case where the input rotary member rotates faster than the output rotary member.

\* \* \* \* \*